United States Patent
Sawamura et al.

(10) Patent No.: US 6,957,895 B2
(45) Date of Patent: Oct. 25, 2005

(54) REFLECTION MIRROR AND OPTICAL EQUIPMENT USING THE SAME

(75) Inventors: Mitsuharu Sawamura, Kanagawa (JP); Shumpei Tatsumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/787,305

(22) Filed: Feb. 27, 2004

(65) Prior Publication Data

US 2004/0169944 A1 Sep. 2, 2004

(30) Foreign Application Priority Data

Feb. 28, 2003 (JP) .......................... 2003-053318

(51) Int. Cl.$^7$ ............................ G02B 5/08; G02B 7/182
(52) U.S. Cl. ........................................ 359/883
(58) Field of Search ................. 359/584, 585, 359/884, 883

(56) References Cited

U.S. PATENT DOCUMENTS

| | | | | |
|---|---|---|---|---|
| 4,522,862 A | * | 6/1985 | Bayer et al. ............ | 428/195.1 |
| 5,424,786 A | | 6/1995 | McCarthy ............... | 359/884 |
| 5,548,440 A | | 8/1996 | Hohenegger et al. ..... | 359/360 |
| 5,583,704 A | * | 12/1996 | Fujii ...................... | 359/884 |
| 6,535,336 B2 | | 3/2003 | Tatsumi .................. | 359/584 |
| 6,709,119 B2 | * | 3/2004 | Gillich et al. ........... | 359/883 |
| 2001/0024323 A1 | | 9/2001 | Yanagi et al. ........... | 359/514 |

FOREIGN PATENT DOCUMENTS

| | | |
|---|---|---|
| CN | 1329259 A | 1/2002 |
| JP | 5-127005 | 5/1993 |
| JP | 6-51110 | 2/1994 |
| JP | 6-313803 | 11/1994 |
| JP | 7-5309 | 1/1995 |
| JP | 8-327809 | 12/1996 |
| JP | 2001-74922 | 3/2001 |
| JP | 2002-55213 | 2/2002 |

* cited by examiner

*Primary Examiner*—Mark A. Robinson
*Assistant Examiner*—Alessandro Amari
(74) *Attorney, Agent, or Firm*—Fitzpatrick, Cella, Harper & Scinto (57) ABSTRACT

A reflection mirror includes an underlaying layer, a reflection layer, and a protective layer on a resin substrate in the order from the resin substrate, in which the reflection layer is composed of an Ag film, each of the underlaying layer and the protective layer includes at least one $TiO_2$ film and at least one $Al_2O_3$ film, and a film of the underlaying layer contacting the resin substrate is a $TiO_2$ film.

12 Claims, 5 Drawing Sheets

REFLECTION MIRROR AND OPTICAL EQUIPMENT USING THE SAME

BACKGROUND OF THE INVENTION

1. Field of the Invention

The present invention relates to a reflection mirror and optical equipment using the reflection mirror, which is stable, has satisfactory durability, and provides a high reflectance, for example, in a predetermined wavelength band in a visible range (wavelength: 400 to 700 nm), and is suitable when applied to an optical member used in an optical system such as a TV camera, a video camera, a digital camera, or the like.

2. Related Background Art

Conventionally, a number of exemplary reflection mirrors using an Al film are known. Recently, however a silver reflection mirror comes to be known, which is obtained by vapor-depositing a silver film having a high reflectance in a wavelength of a wide visible range on a resin substrate.

The silver film as the reflection film has a high reflectance. However, when exposed to the outside air, the silver film corrodes to decrease a reflectance. Thus, the silver film has weak resistance to the environment.

Because of the above, the reflection mirror using a silver film requires measures for providing a protective film for covering the silver film so as to enhance the durability with respect to the environment, for example.

Japanese Patent Application Laid-Open No. H5-127005 or Japanese Patent Application Laid-Open No. H6-313803 discloses a reflection mirror using a sulfide in an underlaying layer (a film provided between a substrate and a silver film) or a protective film for a silver film.

On the other hand, Japanese Patent Application Laid-Open No. H7-005309, Japanese Patent Application Laid-Open No. H8-327809, or Japanese Patent Application Laid-Open No. 2001-074922 discloses a reflection mirror using a gold layer film in an underlaying layer or a protective film for a silver film.

In addition, reflection mirrors composed of a silver film which another material (e.g., Pd, Al or Au) is added to are also known.

In the reflection mirrors proposed by the above-mentioned applications, a resin substrate is used in place of a glass substrate, and measures are adopted in order to prevent decreases in durability and reliability (film peeling, fogging, etc.) caused when using an Ag film in place of an Al film.

However, in the reflection mirrors proposed in the above-mentioned applications, although the enhancement of durability and reliability are recognized, there is a tendency that an initial reflectance after forming a film becomes unstable. Furthermore, as a result of a reliability test such as an adhesion test using a tape, a high-temperature test at 80° C. for 100 hours, and an environmental test at 60° C. and a humidity of 90% for 1,000 hours, film peeling, fogging, and the like occurred in some cases.

SUMMARY OF THE INVENTION

An object of the present invention is to provide a reflection mirror in which a resin substrate is used, and an underlaying layer and a protective film is appropriately provided when a silver film is provided as a reflection layer on the resin substrate, thereby easily obtaining high durability and reliability, and to provide an optical equipment having the reflection mirror.

In order to attain the above-mentioned object, according to a first aspect of the present invention, there is provided a reflection mirror including:

a resin substrate;

an underlaying layer formed on the resin substrate, the underlaying layer including at least one $TiO_2$ film and at least one $Al_2O_3$ film, wherein a film of the underlaying layer contacting the resin substrate is a $TiO_2$ film;

a reflection layer composed of an Ag film formed on the underlaying layer; and a protective layer formed on the reflection layer, the protective layer including at least one $TiO_2$ film and at least one $Al_2O_3$ film.

According to a second aspect of the present invention, there is provided a reflection mirror according to the first aspect of the invention, in which the underlaying layer and the protective layer are composed of alternate layers of a $TiO_2$ film and an $Al_2O_3$ film.

According to a third aspect of the present invention, there is provided a reflection mirror according to the first aspect of the invention, in which a film of the underlaying layer contacting the reflection mirror is a $TiO_2$ film.

According to a fourth aspect of the present invention, there is provided a reflection mirror according to the first aspect of the invention, in which a geometric total film thickness of the $Al_2O_3$ films included in the underlaying layer is 10 nm or more.

According to a fifth aspect of the present invention, there is provided a reflection mirror according to the fourth aspect of the invention, in which a geometric total film thickness of the $Al_2O_3$ films included in the underlaying layer is 100 nm or less.

According to a sixth aspect of the present invention, there is provided a reflection mirror according to the first aspect of the invention, in which a geometric film thickness of the $TiO_2$ film of the underlaying layer contacting the resin substrate is 80 nm or less.

According to a seventh aspect of the present invention, there is provided a reflection mirror according to the first aspect of the invention, in which the protective layer further includes a film of $SiO_x$ ($1<x<2$) having a geometric film thickness of 1 to 20 nm.

According to an eighth aspect of the present invention, there is provided a reflection mirror according to the first aspect of the invention, in which the underlaying layer is composed of 2 layers of a $TiO_2$ film and an $Al_2O_3$ film; 3 layers of a $TiO_2$ film, an $Al_2O_3$ film, and a $TiO_2$ film; 4 layers of a $TiO_2$ film, an $Al_2O_3$ film, a $TiO_2$ film, and an $Al_2O_3$ film; or 5 layers of a $TiO_2$ film, an $Al_2O_3$ film, a $TiO_2$ film, an $Al_2O_3$ film, and a $TiO_2$ film, in the order from the side of the resin substrate.

According to a ninth aspect of the present invention, there is provided a reflection mirror according to the first aspect of the invention, in which the protective layer is composed of 2 layers of an $Al_2O_3$ film and a $TiO_2$ film; 4 layers of an $Al_2O_3$ film, a $TiO_2$ film, an $Al_2O_3$ film, and a $TiO_2$ film; 3 layers of a $TiO_2$ film, an $Al_2O_3$ film, and a $TiO_2$ film; 5 layers of a $TiO_2$ film, an $Al_2O_3$ film, a $TiO_2$ film, an $Al_2O_3$ film, and a $TiO_2$ film; or 3 layers of an $Al_2O_3$ film, a $TiO_2$ film, and an $SiO_x$ ($1<x<2$) film, in the order from the side of the resin substrate.

According to a tenth aspect of the present invention, there is provided an optical member including the reflection mirror according to the first aspect of the invention.

According to an eleventh aspect of the present invention, there is provided an optical equipment including the optical member according to the tenth aspect of the invention.

DETAILED DESCRIPTION OF THE PREFERRED EMBODIMENTS

Hereinafter, the present invention will be described in detail by way of an embodiment with reference to the drawing.

Figure 1:
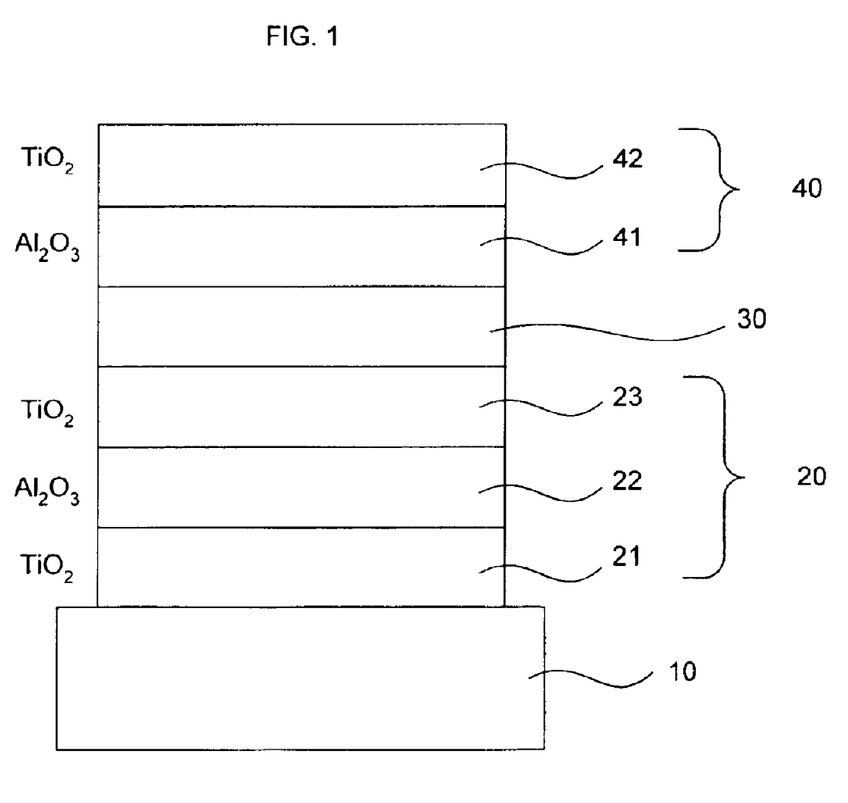
FIG. 1 is a schematic view of an embodiment according to the present invention.
Figure 2:
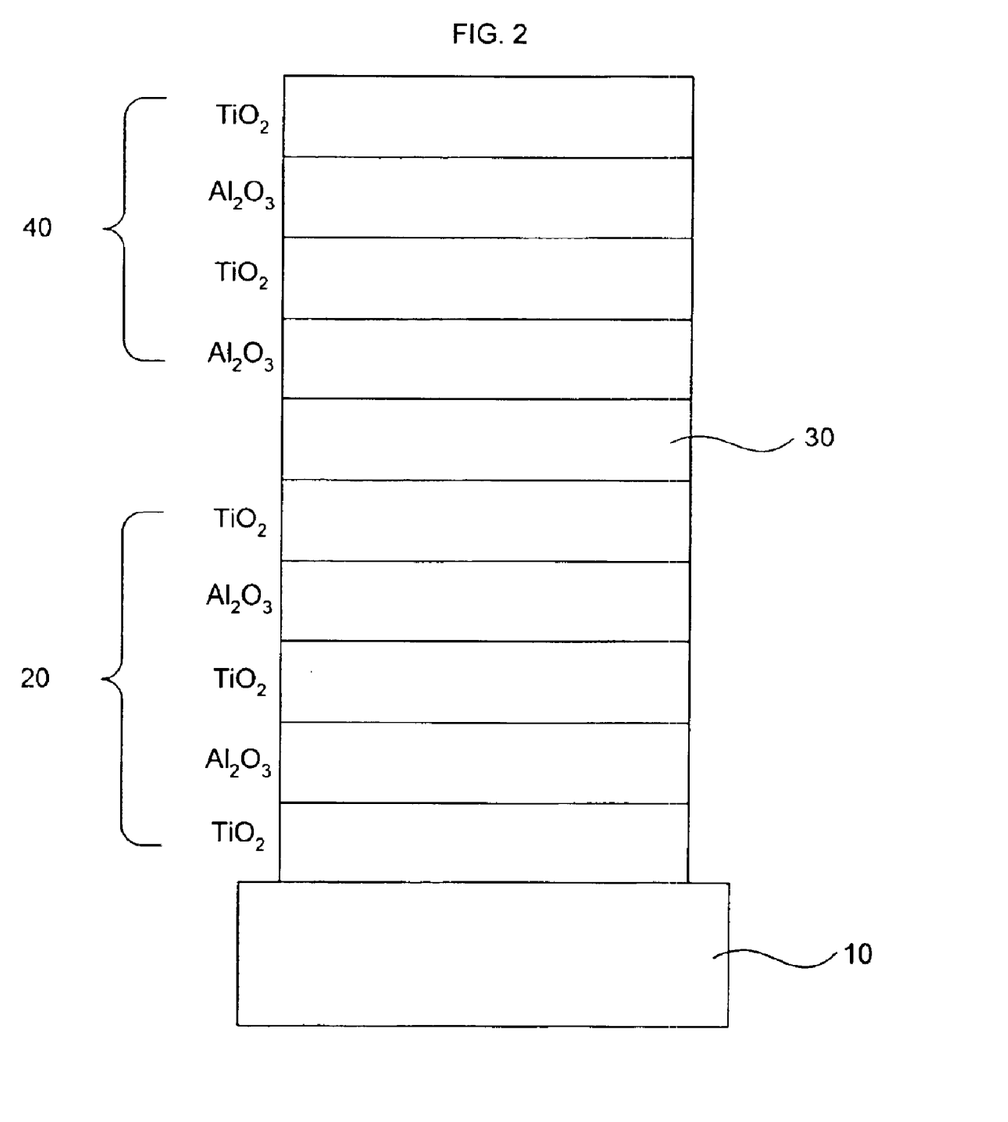
FIG. 2 is a schematic view of another embodiment according to the present invention.
Figure 3:
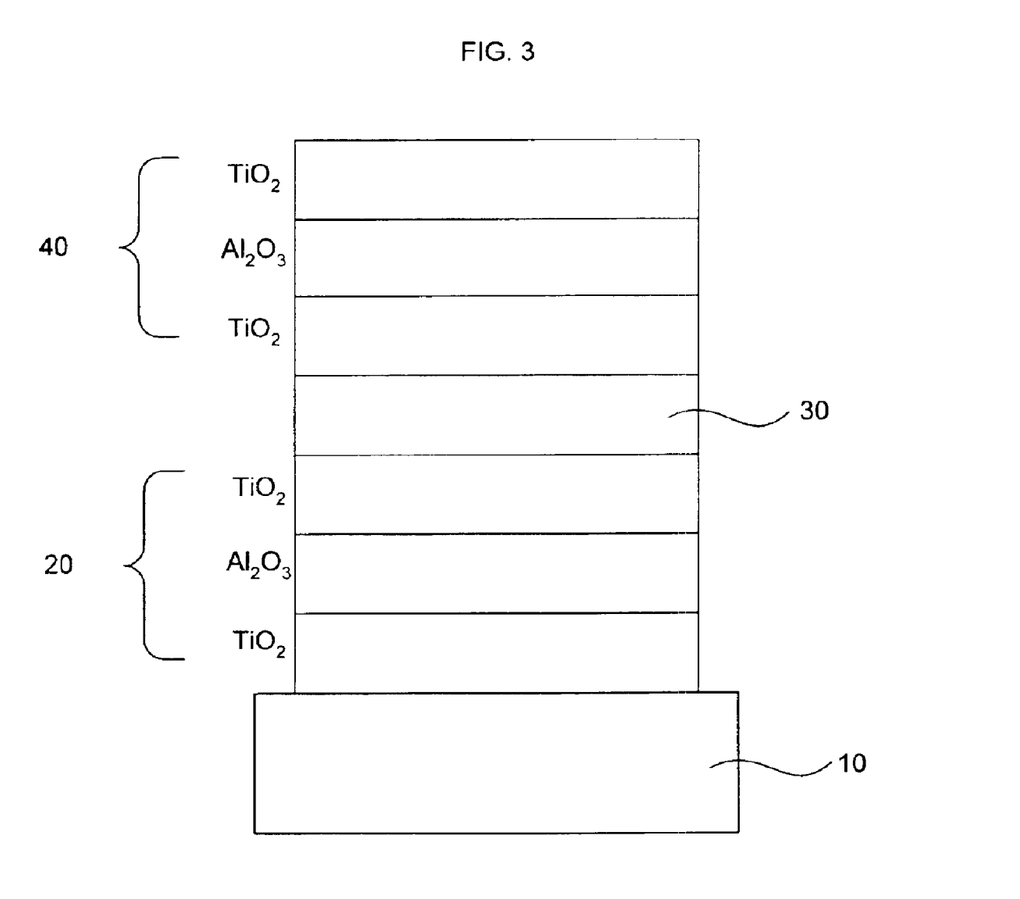
FIG. 3 is a schematic view of yet another embodiment according to the present invention.
Figure 4:
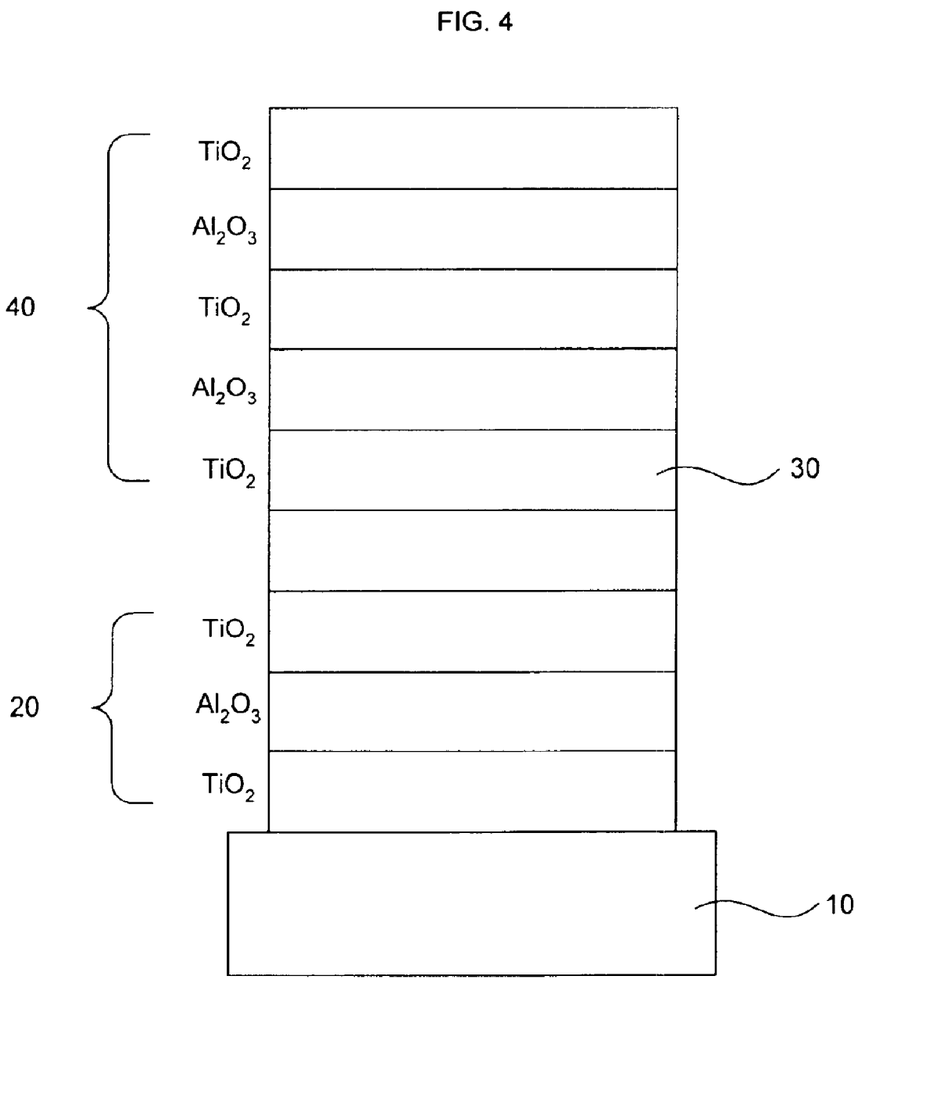
FIG. 4 is a schematic view of yet another embodiment according to the present invention.
Figure 5:
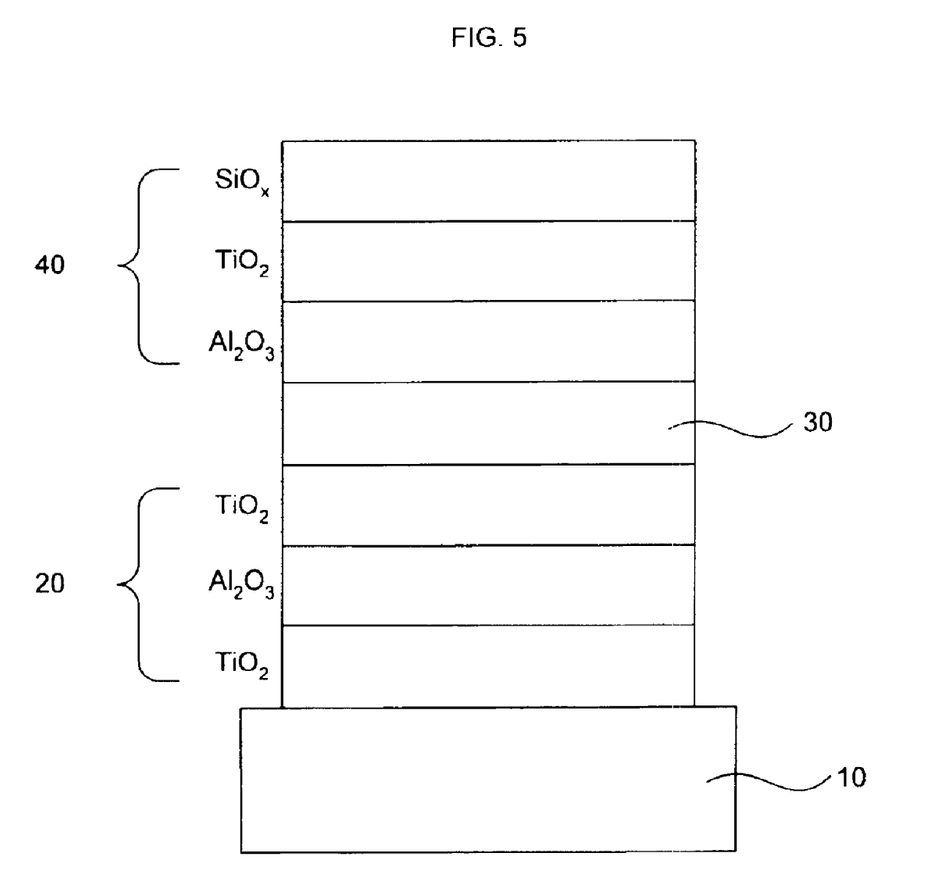
FIG. 5 is a schematic view of yet another embodiment according to the present invention.

FIG. 1 is a schematic cross-sectional view showing the main portion of an embodiment of a reflection mirror (silver reflection mirror) according to the present invention. In the reflection mirror of the present example, an underlaying layer 20, a silver layer 30, and a protective layer 40 are provided successively on a resin substrate 10.

More specifically, the underlaying layer 20 including three layers 21, 22 and 23 is provided on the resin substrate 10. Then, a reflection layer (silver layer) 30, and a protective layer 40 including two layers 41 and 42 are further provided thereon.

Regarding the number of layers of the underlaying layer 20 and the protective layer 40, any number other than the number shown in FIG. 1 may be used, as long as it satisfies the following conditions.

Each of the underlaying layer 20 and the protective layer 40 includes at least one $Al_2O_3$ film. This is because it was found as a result of the examination that in order to enhance the reliability of durability of the silver layer 30, it is effective to provide films having a low moisture transmittance and having a high blocking effect with respect to a degassing component from the substrate 10 on both sides (upper and lower sides) of the silver layer 30.

The protective layer 40 includes a $TiO_2$ film and an $Al_2O_3$ film alternately. This is because it was found that in the case of a surface reflection mirror, a combination of a $TiO_2$ film and an $Al_2O_3$ film is optimum in order to enhance the reliability of a reflection mirror as well as to obtain a high reflectance.

The underlaying layer 20 includes a $TiO_2$ film and an $Al_2O_3$ film alternately. This is because it was found that in the case of a rear surface reflection mirror, in order to enhance the reliability of a reflection mirror, in particular, the adhesion between the silver layer 30 and the underlaying layer 20, or the adhesion between the silver layer 30 and the protective layer 40, as well as to obtain a high reflectance, it is effective that the alternate layers on both sides of the silver layer are made of the same materials and have almost the same structure.

The film 21 of the underlaying layer 20 contacting the resin substrate 10 is formed of a $TiO_2$ film. This is because it was found that a $TiO_2$ film is effective for enhancing the reliability of a reflection mirror, in particular, the adhesion between the resin substrate 10 and the underlaying layer 20.

The film 23 of the underlaying layer 20 contacting the silver layer 30 is formed of a $TiO_2$ film. This is because it was found that a $TiO_2$ film is effective for enhancing the reliability of a reflection mirror, in particular, the adhesion between the silver layer 30 and the underlaying layer 20.

Next, a preferable "geometric film thickness" (that is, "physical film thickness", not an optical film thickness "nd" wherein a film thickness is "d" and a refractive index of a film is "n") of each layer will be described.

The geometric total film thickness of the $Al_2O_3$ films included in the underlaying layer 20 is set to be in a range of 10 nm or more and 100 nm or less. This is because it was found that as the geometric total film thickness of the $Al_2O_3$ films in order to enhance the reliability of the silver layer 30, in particular, to eliminate moisture absorbency and fogging of the silver layer 30 due to a degassing component from the substrate 10, 10 nm or more is required. Furthermore, this is because it was found that as the geometric total film thickness of the $Al_2O_3$ films in order to eliminate film floating in an environmental test at 60° C. and a humidity of 90% for 1,000 hours, 100 nm or less is preferable.

The film thickness of the $TiO_2$ film 21 of the underlaying layer 20 contacting the resin substrate 10 is set to 80 nm or less. This is because it was found that as the geometric film thickness of the $TiO_2$ films in order to avoid film floating in an environmental test at 60° C. and a humidity of 90% for 1,000 hours, 80 nm or less is preferable.

In this embodiment, a second protective layer made of $SiO_x$ (1<x<2) having a geometric film thickness of 1 to 20 nm may be provided on the protective layer 40 composed of alternate layers of the $TiO_2$ film and the $Al_2O_3$ film. This is effective for enhancing the reliability of a reflection mirror, in particular, abrasion resistance of the surface.

Several embodiments satisfying the above conditions are shown in FIGS. 2–5. The reference numbers used in these Figures correspond to those used in FIG. 1.

Next, a specific film structure of each example according to the present invention will be described.

EXAMPLE 1

A silver surface reflection mirror was formed by a vacuum deposition, using an opaque polycarbonate substrate (containing a black component) as a resin substrate 10. The film structure was a 5-layer structure including, in the order from the side of the substrate 10, a $TiO_2$ film (refractive index: about 2.15) and an $Al_2O_3$ film (refractive index: 1.6) as an underlaying layer 20; an Ag film as a reflection film 30; and an $Al_2O_3$ film and a $TiO_2$ film as a protective film 40.

As the respective geometric film thickness, the protective layer 40 had 55 nm for the $Al_2O_3$ film and 60 nm for the $TiO_2$ film. The geometric film thickness of each material of the underlaying layer 20 was also set almost in the same manner. During formation of the films, the substrate was not heated, and as vaporization means, an electron gun was used. The initial reflectance of the silver surface reflection mirror was satisfactory, i.e., 97% or more (wavelength: 550 nm).

In order to evaluate the reliability, an initial adhesion test after forming the films by peeling with a tape, a high-temperature exposure test at 80° C. for 100 hours, and an environmental test at 60° C. and a humidity of 90% for 1,000 hours were performed. Table 1 shows the results. There was no problem in adhesion and an outer appearance in terms of a practical use. In Table 1, symbols "A" and "B" represent that there are no problems in terms of a practical use, and symbol "C" represents that there is a problem.

EXAMPLE 2

A silver surface reflection mirror was formed in the same way as in Example 1. The film structure was a 6-layer structure including, in the order from the side of a substrate 10, a $TiO_2$ film, an $Al_2O_3$ film, and a $TiO_2$ film as an underlaying layer 20; an Ag film as a reflection film 30; and an $Al_2O_3$ film and a $TiO_2$ film as a protective layer 40.

A schematic view of the film structure is similar to that shown in FIG. 1. As the geometric film thickness, the protective layer 40 had 55 nm for the $Al_2O_3$ film and 60 nm for the $TiO_2$ film. The underlaying layer 20 had almost the same geometric film thickness as of the protective layer. The initial reflectance of the silver surface reflection mirror was satisfactory, i.e., 97% or more (wavelength: 550 nm).

In order to evaluate the reliability, an initial adhesion test by peeling with a tape, a high-temperature exposure test at 80° C. for 100 hours, and an environmental test at 60° C. and a humidity of 90% for 1,000 hours were performed. Table 1 shows the results. Both adhesion and an outer appearance were satisfactory.

EXAMPLE 3

A silver surface reflection mirror was formed in the same way as in Example 1. The film structure was a 9-layer structure including, in the order from the side of a substrate 10, a $TiO_2$ film, an $Al_2O_3$ film, a $TiO_2$ film, and an $Al_2O_3$ film as an underlaying layer 20; an Ag film as a reflection film 30; and an $Al_2O_3$ film, a $TiO_2$ film, an $Al_2O_3$ film, and a $TiO_2$ film as a protective layer 40. As the geometric film thickness, the protective layer 40 had 60 nm for the $Al_2O_3$ film, 60 nm for the $TiO_2$ film, 95 nm for the $Al_2O_3$ film, and 40 nm for the $TiO_2$ film, in the order from the side of a silver layer 30. As the respective geometric film thickness, the underlaying layer 20 had 40 nm for the $TiO_2$ film, 50 nm for the $Al_2O_3$ film, 60 nm for the $TiO_2$ film, and 50 nm for the $Al_2O_3$ film, in the order from the side of the substrate 10. The protective layer 40 and the underlaying layer 20 had almost the same structure, with the silver layer 30 interposed therebetween. The initial reflectance of the silver surface reflection mirror was satisfactory, i.e., 98% or more (wavelength: 550 nm).

In order to evaluate the reliability, an initial adhesion test by peeling with a tape, a high-temperature exposure test at 80° C. for 100 hours, and an environmental test at 60° C. and a humidity of 90% for 1,000 hours were performed. Table 1 shows the results. As a result of the environmental test, slight film floating that cannot be detected by visual inspection occurred; however, there were no problems both in adhesion and an outer appearance in terms of a practical use.

EXAMPLE 4

A silver surface reflection mirror was formed in the same way as in Example 1. The film structure was an 11-layer structure including, in the order from the side of a substrate 10, a $TiO_2$ film, an $Al_2O_3$ film, a $TiO_2$ film, an $Al_2O_3$ film, and a $TiO_2$ film as an underlaying layer 20; an Ag film as a reflection film 30; and a $TiO_2$ film, an $Al_2O_3$ film, a $TiO_2$ film, an $Al_2O_3$ film, and a $TiO_2$ film as a protective layer 40. As the geometric film thickness, the protective layer 40 had 95 nm for the $TiO_2$ film, 85 nm for the $Al_2O_3$ film, 60 nm for the $TiO_2$ film, 55 nm for the $Al_2O_3$ film, and 20 nm for the $TiO_2$ film, in the order from the side of a silver layer. As the geometric film thickness, the underlaying layer 20 had 40 nm for the $TiO_2$ film, 10 nm for the $Al_2O_3$ film, 60 nm for the $TiO_2$ film, 10 nm for the $Al_2O_3$ film, and 95 nm for the $TiO_2$ film, in the order from the side of the substrate 10. The protective layer 40 and the underlaying layer 20 had almost the same structure in a symmetric manner, with the silver layer 30 interposed therebetween. Each material of the underlaying layer 20 had almost the same geometric film thickness as of the protective layer 40 in a symmetric manner, with the silver layer 30 interposed therebetween. The initial reflectance of the silver surface reflection mirror was satisfactory, i.e., 97% or more (wavelength: 550 nm).

In order to evaluate the reliability, an initial adhesion test by peeling with a tape, a high-temperature exposure test at 80° C. for 100 hours, and an environmental test at 60° C. and a humidity of 90% for 1,000 hours were performed. Table 1 shows the results. Both adhesion and an outer appearance were satisfactory.

EXAMPLE 5

A silver surface reflection mirror was formed in the same way as in Example 1. The film structure was a 7-layer structure including, in the order from side of a substrate 10, a $TiO_2$ film, an $Al_2O_3$ film, and a $TiO_2$ film as an underlaying layer 20; an Ag film as a reflection film 30; and an $Al_2O_3$ film, a $TiO_2$ film, and an $SiO_x$ film ($1<x<2$) as a protective layer 40. As the geometric film thickness, the protective layer 40 had 55 nm for the $Al_2O_3$ film, 55 nm for the $TiO_2$ film, and 10 nm for the $SiO_x$ film. Each film of the underlaying layer 20 was also almost the same geometric film thickness as of the protective layer. The initial reflectance of the silver surface reflection mirror was satisfactory, i.e., 97% or more (wavelength: 550 nm).

In order to evaluate the reliability, an initial adhesion test by peeling with a tape, a high-temperature exposure test at 80° C. for 100 hours, and an environmental test at 60° C. and a humidity of 90% for 1,000 hours were performed. Table 1 shows the results. Both adhesion and an outer appearance were satisfactory. Furthermore, as a result of a rubbing test with a wet rayon nonwoven fabric, improvement was observed compared with Example 2.

EXAMPLE 6

A silver rear surface reflection mirror was formed in the same way as in Example 1. Here, used as the resin substrate 10 was a transparent polycarbonate substrate. The film structure was a 7-layer structure including, in the order from the side of a substrate 10, a $TiO_2$ film, an $Al_2O_3$ film, and a $TiO_2$ film as an underlaying layer 20; an Ag film as a reflection film 30; and a $TiO_2$ film, an $Al_2O_3$ film, and a $TiO_2$ film as a protective layer 40. As the geometric film thickness, the underlaying layer 20 had 80 nm for the $TiO_2$ film, 80 nm for the $Al_2O_3$ film, and 105 nm for the $TiO_2$ film, in the order from the side of the resin substrate 10. Each film of the protective layer 40 was also the same geometric film thickness in a symmetric manner, with the silver layer 30 interposed therebetween. The initial reflectance of the silver rear surface reflection mirror was satisfactory, i.e., 97% or more (wavelength: 550 nm).

In order to evaluate the reliability, an initial adhesion test by peeling with a tape, a high-temperature exposure test at 80° C. for 100 hours, and an environmental test at 60° C. and a humidity of 90% for 1,000 hours were performed. Table 1 shows the results. As a result of the environmental test, slight film floating that cannot be detected by visual inspection occurred; however, there were no problems both in adhesion and an outer appearance in terms of a practical use.

EXAMPLE 7

A silver surface reflection mirror was formed in the same way as in Example 2. The film structure was a 6-layer structure including, in the order from the side of a substrate 10, a TiO$_2$ film, an Al$_2$O$_3$ film, and a TiO$_2$ film as an underlaying layer 20; an Ag film as a reflection film 30; and an Al$_2$O$_3$ film and a TiO$_2$ film as a protective layer 40. As the geometric film thickness, the protective layer 40 had 55 nm for the Al$_2$O$_3$ film and 60 nm for the TiO$_2$ film. As the geometric film thickness, the underlaying layer 20 had 60 nm for the TiO$_2$ film, 10 nm for the Al$_2$O$_3$ film, and 60 nm for the TiO$_2$ film, in the order from the side of the substrate 10. The protective layer 40 and the underlaying layer 20 had almost the same structure, with the silver layer 30 interposed therebetween. The initial reflectance of the silver surface reflection mirror was satisfactory, i.e., 97% or more (wavelength: 550 nm).

In order to evaluate the reliability, an initial adhesion test by peeling with a tape, a high-temperature exposure test at 80° C. for 100 hours, and an environmental test at 60° C. and a humidity of 90% for 1,000 hours were performed. Table 1 shows the results. As a result of the high-temperature exposure test, very slight fogging that cannot be detected by visual inspection occurred; however, there were no problems both in adhesion and an outer appearance in terms of a practical use.

EXAMPLE 8

A silver surface reflection mirror was formed in the same way as in Example 1. The film structure was a 6-layer structure including, in the order from the side of a substrate 10, a TiO$_2$ film, an Al$_2$O$_3$ film, and a TiO$_2$ film as an underlaying layer 20; an Ag film as a reflection film 30; and an Al$_2$O$_3$ film and a TiO$_2$ film as a protective layer 40.

As the geometric film thickness, the protective layer 40 had 55 nm for the Al$_2$O$_3$ film and 60 nm for the TiO$_2$ film. As the geometric film thickness, the underlaying layer 20 had 60 nm for the TiO$_2$ film, 100 nm for the Al$_2$O$_3$ film, and 60 nm for the TiO$_2$ film, in the order from the side of the substrate 10. The protective layer 40 and the underlaying layer 20 had almost the same structure, with the silver layer 30 interposed therebetween. The initial reflectance of the silver surface reflection mirror was satisfactory, i.e., 97% or more (wavelength: 550 nm).

In order to evaluate the reliability, an initial adhesion test by peeling with a tape, a high-temperature exposure test at 80° C. for 100 hours, and an environmental test at 60° C. and a humidity of 90% for 1,000 hours were performed. Table 1 shows the results. As a result of the environmental test, slight film floating that cannot be detected by visual inspection occurred; however, there were no problems both in adhesion and an outer appearance in terms of a practical use.

Next, comparative examples will be described for comparison with the above examples of the present invention.

COMPARATIVE EXAMPLE 1

A silver surface reflection mirror was formed by a vacuum deposition, using an opaque polycarbonate resin substrate 10 (containing a black component) in the same way as Example 1. The film structure was a 4-layer structure including, in the order from the side of the substrate 10, a TiO$_2$ film as an underlaying layer 20; an Ag film as a reflection film 30; and an Al$_2$O$_3$ film and a TiO$_2$ film as a protective film 40.

As the geometric film thickness, the protective layer 40 had 55 nm for the Al$_2$O$_3$ film and 60 nm for the TiO$_2$ film. As the geometric film thickness, the underlaying layer 20 had 100 nm. The initial reflectance of the silver surface reflection mirror was satisfactory, i.e., 97% or more (wavelength: 550 nm).

In order to evaluate the reliability, an initial adhesion test by peeling with a tape after the film formation, a high-temperature exposure test at 80° C. for 100 hours, and an environmental test at 60° C. and a humidity of 90% for 1,000 hours were performed. Table 1 shows the results. Adhesion was satisfactory; however, fogging occurred regarding an outer appearance. Thus, the resultant reflection mirror was not applicable in terms of a practical use.

COMPARATIVE EXAMPLE 2

A silver surface reflection mirror was formed in the same way as in Comparative Example 1. The film structure was a 4-layer structure including, in the order from the side of a substrate 10, an Al$_2$O$_3$ film as an underlaying layer 20; an Ag film as a reflection film 30; and an Al$_2$O$_3$ film and a TiO$_2$ film as a protective layer 40.

As the geometric film thickness, the protective layer 40 had 55 nm for the Al$_2$O$_3$ film and 60 nm for the TiO$_2$ film. As the geometric film thickness, the underlaying layer 20 had 100 nm. The initial reflectance of the silver surface reflection mirror was satisfactory, i.e., 97% or more (wavelength: 550 nm).

In order to evaluate the reliability, an initial adhesion test after forming the films by peeling with a tape, a high-temperature exposure test at 80° C. for 100 hours, and an environmental test at 60° C. and a humidity of 90% for 1,000 hours were performed. Table 1 shows the results. Regarding an outer appearance, fogging did not occur; however, as the result of the environmental test, floating that can be detected by visual inspection occurred. Furthermore, regarding adhesion, peeling occurred between the substrate 10 and the Al$_2$O$_3$ film or between the Al$_2$O$_3$ film and the silver layer 30. Thus, the resultant reflection mirror was not applicable in terms of a practical use.

COMPARATIVE EXAMPLE 3

A silver surface reflection mirror was formed in the same way as in Comparative Example 1. The film structure was a 5-layer structure including, in the order from the side of a substrate 10, an SiO$_x$ (1<x<2) film and a TiO$_2$ film as an underlaying layer 20; an Ag film as a reflection film 30; and an Al$_2$O$_3$ film and a TiO$_2$ film as a protective layer 40.

As the geometric film thickness, the protective layer 40 had 55 nm for the Al$_2$O$_3$ film and 60 nm for the TiO$_2$ film. As the geometric film thickness, the underlaying layer 20 had 50 nm for the SiO$_x$ film and 100 nm for the TiO$_2$ film, in the order from the side of substrate 10. The initial reflectance of the silver surface reflection mirror was satisfactory, i.e., 97% or more (wavelength: 550 nm).

In order to evaluate the reliability, an initial adhesion test by peeling with a tape after the film formation, a high-temperature exposure test at 80° C. for 100 hours, and an environmental test at 60° C. and a humidity of 90% for 1,000 hours were performed. Table 1 shows the results. Regarding an outer appearance, fogging occurred. As a result of the adhesion test, peeling of the SiO$_x$ film from the substrate occurred in some cases. Thus, the resultant reflection mirror was not applicable in terms of a practical use.

COMPARATIVE EXAMPLE 4

A silver surface reflection mirror was formed in the same way as in Comparative Example 1. The film structure was a 5-layer structure including, in the order from the side of a substrate 10, an Al$_2$O$_3$ film and a TiO$_2$ film as an underlaying layer 20; an Ag film as a reflection film 30; and an Al$_2$O$_3$ film and a $TiO_2$ film as a protective layer 40. As the geometric film thickness, the protective layer 40 had 55 nm for the $Al_2O_3$ film and 60 nm for the $TiO_2$ film. Regarding the geometric film thickness of each films forming the underlaying layer 20, the $Al_2O_3$ film and the $TiO_2$ film were made almost the same as those of the protection layer 40. The initial reflectance of the silver surface reflection mirror was satisfactory, i.e., 97% or more (wavelength: 550 nm).

In order to evaluate the reliability, an initial adhesion test by peeling with a tape, a high-temperature exposure test at 80° C. for 100 hours, and an environmental test at 60° C. and a humidity of 90% for 1,000 hours were performed. Table 1 shows the results. As a result of the adhesion test, peeling of the $Al_2O_3$ film from the substrate occurred in some cases. Also, as a result of the environment test, floating that can be detected by visual inspection occurred. Thus, the resultant reflection mirror was not applicable in terms of a practical use.

TABLE 1

| Evaluation | Adhesion Tape test | Outer appearance Exposure text at 80° C. for 100 hours | Environmental test at 60° C., 90% for 1,000 hours |
|---|---|---|---|
| Ex. 1 | B: Peeling occurred in a very small number | A | A |
| Ex. 2 | A | A | A |
| Ex. 3 | B: Peeling occurred in a very small number | A | B: Slight floating occurred |
| Ex. 4 | A | A | A |
| Ex. 5 | A | A | A |
| Ex. 6 | A | A | B: Slight floating occurred |
| Ex. 7 | A | B: Very slight fogging | A |
| Ex. 8 | A | A | B: Slight floating occurred |
| Compar. Ex. 1 | A | C: Fogging | A |
| Compar. Ex. 2 | C: Peeling occurred | A | C: Floating occurred |
| Compar. Ex. 3 | C: Peeling occurred | C: Fogging | A |
| Compar. Ex. 4 | C: Peeling occurred | A | C: Floating occurred |

When the reflection mirror having the above-mentioned structure is applied to an optical member used in an optical system such as a TV camera, a video camera, a digital camera, or the like, satisfactory optical characteristics can be obtained with ease.

According to the present invention, the resin substrate is used, and the silver film is provided thereon as the reflection layer, whereby the reflection mirror in which high durability and reliability can easily be obtained, and the optical equipment having the reflection mirror can be achieved.

In particular, according to the present invention, even when the resin substrate is used, the silver reflection mirror excellent in reflection characteristics and reliability can be produced.

What is claimed is:

1. A reflection mirror comprising:
   a resin substrate;
   an underlaying layer formed on the resin substrate, the underlaying layer including at least one $TiO_2$ film and at least one $Al_2O_3$ film;
   a reflection layer composed of an Ag film formed on the underlaying layer; and
   a protective layer formed on the reflection layer, the protective layer including at least one $TiO_2$ film and at least one $Al_2O_3$ film,
   wherein each of the underlaying layer and the protective layer is composed of alternating layers of a $TiO_2$ film and an $Al_2O_3$ film,
   wherein a film of the underlaying layer contacting the resin substrate is a $TiO_2$ film, and
   wherein a film of the underlaying layer contacting the reflection layer is a $TiO_2$ film.

2. A reflection mirror according to claim 1, wherein a geometric total film thickness of the $Al_2O_3$ films included in the underlaying layer is 10 nm or more.

3. A reflection mirror according to claim 2, wherein a geometric total film thickness of the $Al_2O_3$ films included in the underlaying layer is 100 nm or less.

4. A reflection mirror according to claim 1, wherein a geometric film thickness of the $TiO_2$ film of the underlaying layer contacting the resin substrate is 80 nm or less.

5. A reflection mirror according to claim 1, wherein the protective layer further includes a film of $SiO_x$ (1<x<2) having a geometric film thickness of 1 to 20 nm.

6. A reflection mirror according to claim 1, wherein the underlaying layer is selected from the group consisting of (i) a combination of a $TiO_2$ film, an $Al_2O_3$ film, and a $TiO_2$ film and (ii) a combination of a $TiO_2$ film, an $Al_2O_3$ film, a $TiO_2$ film, an $Al_2O_3$ film, and a $TiO_2$ film, in order from the resin substrate side.

7. A reflection mirror according to claim 6, wherein the resin substrate is a polycarbonate substrate.

8. A reflection mirror according to claim 1, wherein the protective layer is selected from the group consisting of (i) a combination of an $Al_2O_3$ film and a $TiO_2$ film; (ii) a combination of an $Al_2O_3$ film, a $TiO_2$ film, an $Al_2O_3$ film, and a $TiO_2$ film; (iii) a combination of a $TiO_2$ film, an $Al_2O_3$ film, and a $TiO_2$ film; (iv) a combination of $TiO_2$ film, an $Al_2O_3$ film, a $TiO_2$ film, an $Al_2O_3$ film, and a $TiO_2$ film; (v) a combination of $Al_2O_3$ film, a $TiO_2$ film, and an $SiO_x$ (1<x<2) film, in order from the resin substrate side.

9. A reflection mirror according to claim 8, wherein the resin substrate is a polycarbonate substrate.

10. An optical member comprising the reflection mirror of claim 1.

11. An optical equipment comprising the optical member of claim 10.

12. A reflection mirror according to claim 1, wherein the resin substrate is a polycarbonate substrate.

* * * * *

UNITED STATES PATENT AND TRADEMARK OFFICE
CERTIFICATE OF CORRECTION

| | | |
|---|---|---|
| PATENT NO. | : 6,957,895 B2 | Page 1 of 1 |
| APPLICATION NO. | : 10/787305 | |
| DATED | : October 25, 2005 | |
| INVENTOR(S) | : Mitsuharu Sawamura et al. | |

It is certified that error appears in the above-identified patent and that said Letters Patent is hereby corrected as shown below:

<u>COLUMN 9</u>, line 24,

Table 1, "text" should read --test--.

Signed and Sealed this

Fifteenth Day of August, 2006

JON W. DUDAS
*Director of the United States Patent and Trademark Office*